US007826444B2

(12) United States Patent
Irvin

(10) Patent No.: US 7,826,444 B2
(45) Date of Patent: Nov. 2, 2010

(54) LEADER AND FOLLOWER BROADCAST STATIONS

(75) Inventor: William Irvin, Laguna Beach, CA (US)

(73) Assignee: WideOrbit, Inc., San Francisco, CA (US)

( * ) Notice: Subject to any disclaimer, the term of this patent is extended or adjusted under 35 U.S.C. 154(b) by 420 days.

(21) Appl. No.: 11/735,380

(22) Filed: Apr. 13, 2007

(65) Prior Publication Data

US 2008/0254741 A1 Oct. 16, 2008

(51) Int. Cl.
*H04L 12/50* (2006.01)

(52) U.S. Cl. ...................................................... 370/360

(58) Field of Classification Search ................. 370/360; 709/219; 725/39
See application file for complete search history.

(56) References Cited

U.S. PATENT DOCUMENTS

| | | | |
|---|---|---|---|
| 4,517,562 A | 5/1985 | Martinez | |
| 4,665,514 A | 5/1987 | Ching et al. | |
| 4,723,285 A | 2/1988 | LeRoy et al. | |
| 4,841,357 A * | 6/1989 | Gillies | 375/240.01 |
| 4,845,658 A | 7/1989 | Gifford | |
| 4,864,620 A | 9/1989 | Bialick | |
| 5,096,195 A | 3/1992 | Gimmon | |
| 5,129,036 A | 7/1992 | Dean et al. | |
| 5,260,778 A | 11/1993 | Kauffman et al. | |
| 5,303,326 A | 4/1994 | Dean et al. | |
| 5,440,351 A | 8/1995 | Ichino | |
| 5,515,098 A | 5/1996 | Carles | |
| 5,557,541 A | 9/1996 | Schulhof et al. | |
| 5,576,755 A | 11/1996 | Davis et al. | |
| 5,697,844 A | 12/1997 | Von Kohorn | |
| 5,715,018 A | 2/1998 | Fasciano et al. | |
| 5,724,521 A | 3/1998 | Dedrick | |
| 5,738,583 A | 4/1998 | Comas et al. | |
| 5,948,061 A | 9/1999 | Merriman et al. | |
| 5,999,808 A | 12/1999 | LaDue | |
| 6,011,973 A | 1/2000 | Valentine et al. | |
| 6,104,815 A | 8/2000 | Alcorn et al. | |
| 6,167,382 A | 12/2000 | Sparks et al. | |

(Continued)

FOREIGN PATENT DOCUMENTS

CN 1285079 A 2/2001

(Continued)

OTHER PUBLICATIONS

Zeff, R. and Aronson, B., "*Advertising on the Internet,*" second edition, pp. 1-436 (1999).

(Continued)

*Primary Examiner*—Ayaz R Sheikh
*Assistant Examiner*—Hai-Chang Hsiung
(74) *Attorney, Agent, or Firm*—Wilson Sonsini Goodrich & Rosati

(57) ABSTRACT

An apparatus includes a plurality of software-controlled broadcast stations, each station capable of operating in a leader mode or a follower mode during a simulcast. Each station in the follower mode is configured to broadcast the same programs as a station in the leader mode during common program periods, and to selectively broadcast programs that are different from those broadcast by the station in the leader mode during independent program periods.

31 Claims, 5 Drawing Sheets

U.S. PATENT DOCUMENTS

| | | | | |
|---|---|---|---|---|
| 6,198,906 | B1 | 3/2001 | Boetje et al. | |
| 6,212,392 | B1 | 4/2001 | Fitch et al. | |
| 6,256,508 | B1 * | 7/2001 | Nakagawa et al. | 370/312 |
| 6,260,047 | B1 | 7/2001 | Fox et al. | |
| 6,282,548 | B1 | 8/2001 | Burner et al. | |
| 6,286,005 | B1 | 9/2001 | Cannon | |
| 6,298,218 | B1 | 10/2001 | Lowe et al. | |
| 6,311,214 | B1 | 10/2001 | Rhoads | |
| 6,317,784 | B1 | 11/2001 | Mackintosh et al. | |
| 6,338,043 | B1 | 1/2002 | Miller | |
| 6,374,177 | B1 | 4/2002 | Lee et al. | |
| 6,388,712 | B1 | 5/2002 | Shinohara et al. | |
| 6,401,075 | B1 | 6/2002 | Mason et al. | |
| 6,411,992 | B1 | 6/2002 | Srinivasan et al. | |
| 6,416,414 | B1 | 7/2002 | Stadelmann | |
| 6,470,180 | B1 | 10/2002 | Kotzin et al. | |
| 6,502,076 | B1 | 12/2002 | Smith | |
| 6,508,710 | B1 | 1/2003 | Paravia et al. | |
| 6,509,867 | B1 | 1/2003 | McGibney | |
| 6,527,638 | B1 | 3/2003 | Walker et al. | |
| 6,527,641 | B1 | 3/2003 | Sinclair et al. | |
| 6,606,745 | B2 | 8/2003 | Maggio | |
| 6,628,928 | B1 | 9/2003 | Crosby et al. | |
| 6,628,939 | B2 | 9/2003 | Paulsen | |
| 6,650,892 | B1 | 11/2003 | Thiriet | |
| 6,674,995 | B1 | 1/2004 | Meyers et al. | |
| 6,678,501 | B1 | 1/2004 | Valeski | |
| 6,701,355 | B1 | 3/2004 | Brandt et al. | |
| 6,711,474 | B1 | 3/2004 | Treyz et al. | |
| 6,725,022 | B1 | 4/2004 | Clayton et al. | |
| 6,735,435 | B2 | 5/2004 | Newell et al. | |
| 6,747,706 | B1 | 6/2004 | Geddes et al. | |
| 6,747,760 | B2 | 6/2004 | Geddes et al. | |
| 6,767,284 | B1 | 7/2004 | Koza | |
| 6,778,820 | B2 | 8/2004 | Tendler | |
| 6,820,055 | B2 | 11/2004 | Saindon et al. | |
| 6,820,277 | B1 | 11/2004 | Eldering et al. | |
| 6,829,475 | B1 | 12/2004 | Lee et al. | |
| 6,850,839 | B1 | 2/2005 | McGibney | |
| 6,895,238 | B2 | 5/2005 | Newell et al. | |
| 6,915,107 | B1 | 7/2005 | Lusk | |
| 6,941,324 | B2 | 9/2005 | Plastina et al. | |
| 6,952,559 | B2 | 10/2005 | Bates et al. | |
| 6,957,041 | B2 | 10/2005 | Christensen et al. | |
| 6,961,549 | B2 | 11/2005 | Mori | |
| 6,963,910 | B1 | 11/2005 | Belknap et al. | |
| 6,975,835 | B1 | 12/2005 | Lake et al. | |
| 6,985,882 | B1 | 1/2006 | Del Soto | |
| 7,036,136 | B1 | 4/2006 | Worthy | |
| 7,039,930 | B1 | 5/2006 | Goodman et al. | |
| 7,054,592 | B2 | 5/2006 | Tatsumi et al. | |
| 7,069,582 | B2 | 6/2006 | Philyaw et al. | |
| 7,085,732 | B2 | 8/2006 | Gould | |
| 7,158,753 | B2 | 1/2007 | Kagan et al. | |
| 7,167,454 | B2 | 1/2007 | Caldwell et al. | |
| 7,349,663 | B1 | 3/2008 | Joseph | |
| 2001/0003099 | A1 | 6/2001 | Von Kohorn | |
| 2001/0018858 | A1 | 9/2001 | Dwek | |
| 2001/0037304 | A1 | 11/2001 | Paiz | |
| 2001/0048748 | A1 | 12/2001 | Van Ryzin | |
| 2001/0051559 | A1 | 12/2001 | Cohen et al. | |
| 2002/0023020 | A1 | 2/2002 | Kenyon et al. | |
| 2002/0038455 | A1 | 3/2002 | Srinivasan et al. | |
| 2002/0042923 | A1 | 4/2002 | Asmussen et al. | |
| 2002/0049037 | A1 | 4/2002 | Christensen et al. | |
| 2002/0056118 | A1 | 5/2002 | Hunter et al. | |
| 2002/0059646 | A1 | 5/2002 | Kim | |
| 2002/0069404 | A1 | 6/2002 | Copeman et al. | |
| 2002/0092019 | A1 | 7/2002 | Marcus | |
| 2002/0099600 | A1 | 7/2002 | Merriman et al. | |
| 2002/0122052 | A1 | 9/2002 | Reich et al. | |
| 2002/0133820 | A1 * | 9/2002 | Arai et al. | 725/39 |
| 2002/0168967 | A1 | 11/2002 | Clapper | |
| 2002/0178058 | A1 | 11/2002 | Ritchie et al. | |
| 2002/0194215 | A1 | 12/2002 | Cantrell et al. | |
| 2003/0003990 | A1 * | 1/2003 | Von Kohorn | 463/25 |
| 2003/0009452 | A1 | 1/2003 | O'Rourke et al. | |
| 2003/0023489 | A1 | 1/2003 | McGuire et al. | |
| 2003/0045273 | A1 | 3/2003 | Pyhalammi et al. | |
| 2003/0069032 | A1 | 4/2003 | Jarvi et al. | |
| 2003/0070167 | A1 | 4/2003 | Holtz et al. | |
| 2003/0093530 | A1 | 5/2003 | Syed | |
| 2003/0105809 | A1 | 6/2003 | Yoshii et al. | |
| 2003/0119528 | A1 | 6/2003 | Pew et al. | |
| 2003/0126616 | A1 | 7/2003 | Dewa | |
| 2003/0139190 | A1 | 7/2003 | Steelberg et al. | |
| 2003/0229559 | A1 | 12/2003 | Panttaja et al. | |
| 2004/0024633 | A1 | 2/2004 | Whymark | |
| 2004/0028388 | A1 | 2/2004 | Kataoka et al. | |
| 2004/0038723 | A1 | 2/2004 | Schneier et al. | |
| 2004/0064524 | A1 | 4/2004 | Van Steenbergen et al. | |
| 2004/0087326 | A1 | 5/2004 | Dunko et al. | |
| 2004/0093394 | A1 * | 5/2004 | Weber et al. | 709/219 |
| 2004/0103026 | A1 | 5/2004 | White | |
| 2004/0117826 | A1 | 6/2004 | Karaoguz et al. | |
| 2004/0127199 | A1 | 7/2004 | Kagan et al. | |
| 2004/0198217 | A1 | 10/2004 | Lee et al. | |
| 2004/0215515 | A1 | 10/2004 | Perry | |
| 2004/0236864 | A1 | 11/2004 | Stevenson et al. | |
| 2004/0244042 | A1 | 12/2004 | Billmaier | |
| 2005/0015800 | A1 | 1/2005 | Holcomb | |
| 2005/0020238 | A1 | 1/2005 | Eastman et al. | |
| 2005/0021396 | A1 | 1/2005 | Pearch et al. | |
| 2005/0039206 | A1 | 2/2005 | Opdycke et al. | |
| 2005/0043020 | A1 | 2/2005 | Lipsanen et al. | |
| 2005/0065806 | A1 | 3/2005 | Harik | |
| 2005/0065844 | A1 | 3/2005 | Raj et al. | |
| 2005/0090279 | A9 | 4/2005 | Witkowski et al. | |
| 2005/0105725 | A1 | 5/2005 | Lee | |
| 2005/0137958 | A1 | 6/2005 | Huber et al. | |
| 2005/0198317 | A1 | 9/2005 | Byers | |
| 2005/0227678 | A1 | 10/2005 | Agrawal et al. | |
| 2005/0239402 | A1 | 10/2005 | Gioscia et al. | |
| 2005/0265396 | A1 * | 12/2005 | Steelberg et al. | 370/486 |
| 2005/0267817 | A1 | 12/2005 | Barton et al. | |
| 2005/0278769 | A1 | 12/2005 | Steelberg et al. | |
| 2006/0019642 | A1 * | 1/2006 | Steelberg et al. | 455/414.3 |
| 2006/0133407 | A1 | 6/2006 | Kuisma | |
| 2006/0143236 | A1 | 6/2006 | Wu | |
| 2006/0146765 | A1 | 7/2006 | Van de Sluis et al. | |
| 2006/0176374 | A1 * | 8/2006 | Oklejas | 348/211.8 |
| 2006/0195863 | A1 | 8/2006 | Whymark | |
| 2006/0212901 | A1 | 9/2006 | Steelberg et al. | |
| 2006/0218401 | A1 | 9/2006 | Jun | |
| 2006/0248209 | A1 | 11/2006 | Chiu et al. | |
| 2006/0268667 | A1 | 11/2006 | Jellison, Jr. et al. | |
| 2006/0282533 | A1 | 12/2006 | Steelberg et al. | |
| 2006/0294571 | A1 | 12/2006 | Moore et al. | |
| 2007/0022459 | A1 | 1/2007 | Gaebel et al. | |
| 2007/0027958 | A1 | 2/2007 | Haslam | |
| 2007/0078712 | A1 | 4/2007 | Ott et al. | |
| 2007/0078714 | A1 | 4/2007 | Ott et al. | |
| 2007/0094042 | A1 | 4/2007 | Ramer et al. | |
| 2007/0118873 | A1 | 5/2007 | Houh et al. | |
| 2007/0130012 | A1 | 6/2007 | Yruski et al. | |
| 2007/0157261 | A1 | 7/2007 | Steelberg et al. | |
| 2007/0245020 | A1 | 10/2007 | Ott | |
| 2007/0250856 | A1 | 10/2007 | Leavens et al. | |
| 2007/0259318 | A1 | 11/2007 | Harrison | |
| 2008/0021710 | A1 | 1/2008 | Ho | |
| 2008/0046948 | A1 | 2/2008 | Verosub | |
| 2008/0077264 | A1 | 3/2008 | Irvin et al. | |
| 2008/0208378 | A1 | 8/2008 | Booth et al. | |
| 2008/0249982 | A1 | 10/2008 | Lakowske | |

| | | | |
|---|---|---|---|
| 2008/0253307 A1 | 10/2008 | Irvin | |
| 2008/0255686 A1 | 10/2008 | Irvin et al. | |
| 2008/0256080 A1 | 10/2008 | Irvin et al. | |
| 2008/0256109 A1 | 10/2008 | Irvin et al. | |
| 2009/0019374 A1* | 1/2009 | Logan et al. | 715/753 |
| 2010/0064338 A1 | 3/2010 | Steelberg et al. | |

FOREIGN PATENT DOCUMENTS

| | | |
|---|---|---|
| JP | 03-184486 | 8/1991 |
| JP | 05-284162 | 10/1993 |
| JP | 07-505028 | 6/1995 |
| JP | 09-018430 | 1/1997 |
| JP | 2000-244427 | 9/2000 |
| JP | 2002-368704 | 12/2002 |
| KR | 10-1997-0019597 | 4/1997 |
| KR | 10-2001-0112410 | 12/2001 |
| WO | WO 97/15999 A2 | 5/1997 |
| WO | WO 97/21183 | 6/1997 |
| WO | WO 97/15999 A3 | 7/1997 |
| WO | WO 97/34384 A1 | 9/1997 |
| WO | WO 99/49663 A1 | 9/1999 |
| WO | WO 01/35667 A1 | 5/2001 |
| WO | WO 02/01869 A1 | 1/2002 |
| WO | WO 02/25467 A1 | 3/2002 |
| WO | WO 02/27425 A2 | 4/2002 |
| WO | WO 02/27425 A3 | 5/2003 |
| WO | WO 2004/017163 A2 | 2/2004 |
| WO | WO 2004/017163 A3 | 11/2004 |

OTHER PUBLICATIONS

Langheinrich, M., et al., "Unintrusive Customization Techniques for Web Advertising" NEC Corporation, C&C Media Research Laboratories. Japan [Online], [retrieved on Apr. 1, 2008]. Retrieved from the Internet <URL:http://web.archive.org/web/20000819020800/www.ccrl.com/adwiz/adwiz-www8.html>.

Adknowledge Primary Services, Customer Reference Guide. pp. 1-90, 2000.

Accipiter, Inc., "Accipiter announces Accipiter AdManager, a breakthrough in Internet advertising and marketing" [Online], [retrieved on Apr. 1, 2008]. Retrieved from the Internet <URL: http://web.archive.org/web/19980201092220/www.accipiter.com/press/releases/pr_adman10.htm> Sep. 9, 1996.

Engage Technologies, Accipiter, "Questions and Answers about using Accipiter AdManager with Engage Precision Profiles" [Online], [retrieved on Apr. 1, 2008]. Retrieved from the Internet <URL:http://web.archive.org/web/19990209022600/www.accipiter.com/products/admanager/adm_profilesfaq.htm> Feb. 9, 1999.

Engage Technologies, Accipiter, "AdManager Frequently Asked Questions." [Online], [retrieved Apr. 1, 2008]. Retrieved from the Internet <URL:http://web.archive.org/web/19990208222457/www.accipiter.com/products/admanager/adm_faq.htm> Feb. 8, 1999.

Aaddzz Brokers Web Ad Space Sales Between Advertisers & Publishers, "The Best Way to Buy and Sell Web Advertising Space," 1997. [online] Retrieved from the Internet: <URL:http://www.aaddzz.com>.

Adforce, User Guide Version 2.6, "A Complete Guide to AdForce," 1998.

AdKnowledge Corporate Information, Company Overview, [online retrieved Aug. 16, 2007] Retrieved from <URL:http://web.archive.org/web/19990128143110/www.adknowledge.com/corporate/index.html>.

Adknowledge Customers, i-traffic, [Online], [retrieved Aug. 16, 2007] Retrieved from the Internet: <URLhttp://web.archive.org/web/19990503093107/www.adknowledge.com/aksystem/profile_itraffic.html>.

ADWIZ by NEC, "The Artificial Intelligence Solution for Advertisement Targeting," [Online], [retrieved Apr. 1, 2008] Retrieved from the Internet: <URL:http://web.archive.org/web/20000816042946/http://www.ccrl.com/adwiz/>.

AdKnowledge, Inc., Campaign Manager, "Streamlines buying and trafficking while saving time and money," [Online], [retrieved Aug. 16, 2007] Retrieved from the internet: <URL:http://web.archive.org/web/19990221080152/www.adknowledge.com/aksystem/campaign.html>.

NEC Corporation, "ADWIZ Intelligent Advertisement Targeting,".

Information Access Technologies, Inc., Aaddzz Highlights: The Maximum Performance Ad Network, "Aaddzz brokers Web ad space between advertisers & publishers," 1997 [Online], [retrieved Apr. 15, 2008] Retrieved from the Internet: <URL:http://web.archive.org/web/19980130092746/www.aaddzz.com/pages/b-highlights>.

Information Access Technologies, Inc., "Introduction to Aaddzz," [Online], [retrieved Apr. 15, 2008] Retrieved from the Internet: <URL:http://web.archive.org/web/19980130092752/www.aaddzz.com/pages/b-intro>.

Information Access Technologies, Inc., "Aaddzz Publishers," [Online], [retrieved Apr. 15, 2008] Retrieved from the Internet: <URL:http://web.archive.org/web/19980130092758/www.aaddzz.com/pages/b-publish>.

Information Access Technologies, Inc., "Aaddzz Advertisers," [Online], [retrieved Apr. 15, 2008] Retrieved from the Internet: <URL:http://web.archive.org/web/19980130092804/www.aaddzz.com/pages/b-advertise>.

Information Access Technologies, Inc., Aaddzz Ads, Spaces, & Places [Online], [retrieved Apr. 14, 2008] Retrieved from the Internet: <URL:http://web.archive.org/web/19980130092810/www.aaddzz.com/pages/b-adspacesplaces>.

Information Access Technologies, Inc., "Aaddzz Real-Time Reporting & Statements," [Online], [retrieved Apr. 15, 2008] Retrieved from the Internet: <URL:http://web.archive.org/web/19980130092816/www.aaddzz.com/pages/b-realtime>.

Information Access Technologies, Inc., "Aaddzz Buying Ad Space with Aaddzz," [Online], [retrieved Apr. 15, 2008] Retrieved from the Internet: <URL:http://web.archive.org/web/19980130092822/www.aaddzz.com/pages/advertising>.

Information Access Technologies, Inc., "Aaddzz Selling Ad Space With Aaddzz," [Online], [retrieved Apr. 15, 2008] Retrieved from the Internet: <URL:http://web.archive.org/web/19980130092829/www.aaddzz.com/pages/selling>.

Information Access Technologies, Inc., "Aaddzz Fees and Payments," [Online], [retrieved Apr. 15, 2008] Retrieved from the Internet: <URL:http://web.archive.org/web/19980130092836/www.aaddzz.com/pages/pricing>.

Information Access Technologies, Inc., "Aaddzz Ratings," [Online], [retrieved Apr. 15, 2008] Retrieved from the Internet: <URL:http://web.archive.org/web/19980130092842/www.aaddzz.com/pages/ratings>.

Information Access Technologies, Inc., "Aaddzz Ad Sizes," [Online], [retrieved Apr. 15, 2008] Retrieved from the Internet: <URL:http://web.archive.org/web/19980130092848/www.aaddzz.com/pages/sizes>.

Information Access Technologies, Inc., "Aaddzz Free Access Reports," [Online], [retrieved Apr. 15, 2008] Retrieved from the Internet: <URL:http://web.archive.org/web/19980130092902/www.aaddzz.com/pages/reports>.

Information Access Technologies, Inc., "Aaddzz Advanced Topics," [Online], [retrieved Apr. 15, 2008] Retrieved from the Internet: <URL:http://web.archive.org/web/19980130092908/www.aaddzz.com/pages/advanced>.

Information Access Technologies, Inc., "Aaddzz Frequently Asked Questions," [Online], [retrieved Apr. 15, 2008] Retrieved from the Internet: <URL:http://web.archive.org/web/19980130092914/www.aaddzz.com/pages/faq>.

Information Access Technologies, Inc., "Aaddzz Home Page," [Online], [retrieved Apr. 15, 2008] Retrieved from the Internet: <URL:http://www.aaddzz.com/letter.html>.

NEC Corporation, NEC: Press Release "NEC announces ADWIZ, an Artificial Intelligence Solution for Advertisement Targeting Software on the World Wide Web," Jan. 8, 1999.

AdKnowledge Inc., "Comprehensive Planning," [Online], [retrieved on Aug. 16, 2007] Retrieved from the Internet: <URL:http://web.archive.org/web/19990221144457/www.adknowledge.com/aksystem/planner.html>.

AdKnowledge Inc., "Automates the targeting and serving of web advertising campaigns," [Online], [retrieved on Aug. 16, 2007]

Retrieved from the Internet: <URL:http://web.archive.org/web/19990222023416/www.adknowledge.com/aksystem/smartbanner.html>.
IEEE Intelligent Systems, New Products, "Tell your computer where to go," United Kingdom, Jan./Feb. 1998.
AdKnowledge Inc., "The AdKnowledge System," [Online], [retrieved on Aug. 16, 2007] Retrieved from the Internet: <URL:http://web.archive.org/web/19990221115917/www.adknowledge.com/aksystem/index.html>.
AdKnowledge Inc., Corporate Information "AdKnowledge Events," [Online], [retrieved on Aug. 16, 2007] Retrieved from the Internet: <URL:http://web.archive.org/web/20000511005235/www.adknowledge.com/whatsnew/events.html>.
NEC Corporation, ADWIZ White Paper, "Taking Online Ad Targeting to the Next Level," [Online], [retrieved on Apr. 15, 2008] Retrieved from the Internet: <URL:http://web.archive.org/web/20010619222015/www.ccrl.com/adwiz/whitepaper.html>.
ScanScout, "ScanScout in the News," [Online], [retrieved Apr. 16, 2008]. Retrieved from the Internet: <URL:http://scanscout.com/>.
Blinkx, "Video Search Engine—Blinkx," [Online], [retrieved Apr. 16, 2008]. Retrieved from the Internet: <URL:http://blinkx.com>.
EveryZing, Inc., "Video SEO and Multimedia Search Solutions," [Online], [retrieved Apr. 16, 2008], Retrieved from the Internet: <URL:http://everyzing.com/>.
Inside Online Video, "Blinkx to Contextualize Video Ads Through Speech Recognition," Jun. 22, 2007 [Online], [retrieved Apr. 16, 2008] Retrieved from the Internet: <URL:http://www.insideonlinevideo.com/20007/06/22/blinkx-to-contextualize-video-ads-through-speech-recognition/>.
"By Using Multicast, Wireless Communication, New Information Can Be Distributed," Nikkei Internet Technology, Sep. 22, 1997, pp. 106-111, vol. 3. (in Japanese, see explanation).
"Eonstreams, Advertise with us!," Eonstreams, Inc., 2006, 1 page, [online] [retrieved on Apr. 28, 2006] Retrieved from the Internet: <URL:http://www.eonstreams com/Advertisers.htm>.
"Eonstreams, advertising . . . ," Eonstreams, Inc., 2004, 1 page, [online] [retrieved on Apr. 7, 2005] Retrieved from the Internet: <URL:http://www.eonstreams.com/ServicesAdv.htm>.
"Eonstreams, be on eon!," Eonstreams, Inc., 2004, 1 page, [online] [retrieved on Apr. 7, 2005] Retrieved from the Internet: <URL:http://www.eonstreams.com/>.
"Eonstreams, Better together . . . ," Eonstreams, Inc., 2006, 1 page, [online] [retrieved on May 22, 2006] Retrieved from the Internet: <URL:http://www.eonstreams.com/>.
"Eonstreams, case studies . . . ," Eonstreams, Inc., 2004, 2 pages, [online] [retrieved on Apr. 7, 2005] Retrieved from the Internet: <URL:http://www.eonstreams.com/SamplesCase.htm>.
"Eonstreams, clients love us . . . ," Eonstreams, Inc., 2004, 1 page, [online] [retrieved on Apr. 28, 2005] Retrieved from the Internet: <URL:http://www.eonstreams.com/Testimonials.htm>.
"Eonstreams, FAQs," Eonstreams, Inc., Mar. 3, 2006, 7 pages, [online] [retrieved on Apr. 28, 2006] Retrieved from the Internet: <URL:http://www.eonstreams.com/HowToFaqs.htm>.
"Eonstreams, Inc. Secures Financing to Deploy Revolutionary Ad Insertion Capability," Source Eonstreams, Inc., Mar. 29, 2005, 2 Pages, [online] [retrieved on Apr. 8, 2005] Retrieved from the Internet: <URL:http://www.prnewswire.com/cgi-bin/stories.pl?ACCT=104&STORY=/www/story/03-29-2005/0003288. . . >.
"Eonstreams, Kevin Woods, CTO," Eonstreams, Inc., 2004, 1 page, [online] [retrieved on Apr. 7, 2005] Retrieved from the Internet: <URL:http://wvvw.eonstreams.com/CoInfoCTO.htm>.
"Eonstreams, pay-per-view . . . ," Eonstreams, Inc., 2004, 1 page, [online] [retrieved on Apr. 7, 2005] Retrieved from the Internet: <URL:http://www.eonstreams.com/ServicesPPV.htm>.
"Eonstreams, Press releases . . . ," Eonstreams, Inc., Feb. 2, 2006, 6 pages, [online] [retrieved on Apr. 28, 2006] Retrieved from the Internet: <URL:http://www.eonstreams.com/PressReleases.htm>.
"Eonstreams, Steve Newman, CEO," Eonstreams, Inc., 2004, 1 page, [online] [retrieved on Apr. 7, 2005] Retrieved from the Internet: <URL:http://www.eonstreams.com/CoInfoCEO.htm>.
"Eonstreams, streaming . . . ," Eonstreams, Inc., 2004, 1 page, [online] [retrieved on Apr. 7, 2005] Retrieved from the Internet: <URL:http://www.eonstreams.com/ServicesStreaming.htm>.
"Eonstreams, Streaming . . . ," Eonstreams, Inc., 2006, 1 page, [online] [retrieved on Apr. 28, 2006] Retrieved from the Internet: <URL:http://www.eonstreams.com/Streaming.htm>.
"Eonstreams, subscription . . . ," Eonstreams, Inc., 2004, 1 page, [online] [retrieved on Apr. 7, 2005] Retrieved from the Internet: <URL:http://www.eonstreams.com/ServicesSub.htm>.
"Eonstreams, Susan Seagraves, CFO," Eonstreams, Inc., 2004, 1 page, [online] [retrieved on Apr. 7, 2005] Retrieved from the Internet: <URL:http://wwvv.eonstreams.com/CoInfoCFO.htm>.
"Eonstreams, testimonials, 650WSM Nashville's Country Legend!, WSM | Citadel Broadcasting Corporation," Eonstreams, Inc., 2004, 1 page, [online] [retrieved on Apr. 7, 2005] Retrieved from the Internet: <URL:http://www.eonstreams.com/TestimonialsWSM.htm>.
"Eonstreams, testimonials, Citadel Communications Corporation, WSM | Citadel Broadcasting Corporation," Eonstreams, Inc., 2004, 2 pages, [online] [retrieved on Apr. 7, 2005] Retrieved from the Internet: <URL:http://www.eonstreams.com/TestimonialsCitadel.htm>.
"Eonstreams, Tools . . . ," Eonstreams, Inc., 2006, 1 page, [online] [retrieved on Apr. 28, 2006] Retrieved from the Internet: <URL:http://www.eonstreams.com/How_To_ Tools.htm>.
"Eonstreams, total solutions . . . ," Eonstreams, Inc., 2004, 1 page, [online] [retrieved on Apr. 7, 2005] Retrieved from the Internet: <URL:http://www.eonstreams.com/Services.htm>.
"Eonstreams, what we do . . . ," Eonstreams, Inc., 2004, 1 page, [online] [retrieved on Apr. 7, 2005] Retrieved from the Internet: <URL:http://www.eonstreams.com/Samples.htm>.
"Eonstreams, Who we are . . . ," Eonstreams, Inc., 2006, 1 page, [online] [retrieved on Apr. 28, 2006] Retrieved from the Internet: <URL:http://www.eonstreams.com/About_Us.htm>.
"Eonstreams, WIVK Knoxville, TN . . . ," Eonstreams, Inc., 2004, 1 page, [online] [retrieved on Apr. 7, 2005] Retrieved from the Internet: <URL:http://www.eonstreams.com/SamplesDemosWIVK.htm>.
"Eonstreams, Z100, NY . . . ," Eonstreams, Inc., 2004, 1 page, [online] [retrieved on Apr. 7, 2005] Retrieved from the Internet: <URL:http://www.eonstreams.com/SamplesDemosZ100.htm>.
"MediaSpan Online Services Partners With Eonstreams," EContentMag.com, Feb. 3, 2006, 3 pages, [online] [retrieved on Apr. 28, 2006] Retrieved from the Internet: <URL:http://www.econtentmag.com/Articles/ArticleReader.aspx?ArticleID=15031>.
"NAB2005—The World's Largest Electronic Media Show," National Association of Broadcasters, 2005, 2 pages, [online] [retrieved on Apr. 28, 2006] Retrieved from the Internet: <URL:http://www.nabshow.com/exhibitors/NAB2005/company.asp? id=11150>.
"Streaming Audio and Video Development and Media Hosting Solutions," VitalStream, Inc., 2000-2006, 1 page, [online] [retrieved on May 22, 2006] Retrieved from the Internet: <URL:http://www.vitalstream.com/about/index.html.>.
"VitalStream Acquires Eonstreams to Provide Comprehensive Online Advertising Solutions," VitalStream, Press Release, May 22, 2006, 3 pages, [online] [retrieved on May 22, 2006] Retrieved from the Internet: <URL:www.vitalstream.com/news/release-05-22-06.html>.
DSP-32C Brochure, Ariel Corporation, 433 River Road, Highland Park, NJ 08904, (201) 249-2900, May 1, 1989.
European Patent Office: Supplementary European Search Report for International Application No. PCT/US2005/016405 (6 pages). Munich, Germany. Sep. 18, 2008.
International Search Report and the Written Opinioin of the International Searching Authority, or the Declaration; PCT/US2006/047944, dated Nov. 6, 2008.
International Search Report and the Written Opinion of the Int'l Searching Authority, or the Declaration. Int'l application No. PCT/US 06/47944, form PCT/ISA/220 dated Apr. 24, 2008.
International search report and written opinion in Application No. PCT/US2008/059898, dated Aug. 14, 2008.
International Search Report and Written Opinion, PCT International Patent Application No. PCT/US06/09797 dated Aug. 23, 2007.
International Search Report and Written Opinion, PCT US06-09349 dated Jun. 9, 2008.
International Search Report and Written Opinion, PCT/US06/09401 dated Sep. 22, 2006.

International Search Report and Written Opinion, PCT/US06/19096 dated Apr. 30, 2007, 7 pages.
International Search Report and Written Opinion, PCT/US06/28483 dated Jul. 18, 2007.
International search report dated Feb. 24, 2009 for PCT Application No. US2008/60169.
International search report dated Sep. 16, 2008 for PCT Application No. US2008/60088.
International search report dated Feb. 18, 2009 for PCT Application No. US2008/60175.
International Search Report, dated Feb. 12, 2008 for PCT/US2007/079088.
International Search Report, PCT/US02/04769 dated Jul. 23, 2002.
International Search Report, PCT/US02/19983 dated Oct. 18, 2002.
International search reported dated Sep. 26, 2008 for PCT Application No. US2008/60024.
International Searching Authority Written Opinion, dated Feb. 12, 2008 for PCT/US2007/079088.
Kumar, Shreyas, Patent Examination for Australian Patent Application No. 2006227730, in Examination Report mailed May 22, 2009.
MM-96 Brochure, Ariel Corporation, 1990.
SX-10 Brochure, Antex Electronics, Mar. 1989.
Windows XP Media Center Edition 2004 Review. Available at http://www.winsupersite.com/reviews/windowsxp_mce2004.asp Sep. 30, 2003. Accessed Jan. 12, 2009.
European search report dated May 27, 2010 for Application No. 2742282.3.

* cited by examiner

LEADER AND FOLLOWER BROADCAST STATIONS

CROSS REFERENCE TO RELATED APPLICATIONS

This application is related to U.S. patent application Ser. No. 11/735,404, titled "Multi-Station Media Controller," filed concurrently with the present application, the contents of which are incorporated by reference.

BACKGROUND

This document relates to management of broadcast stations.

Broadcast stations, such as over-the-air radio stations or Internet radio stations, broadcast or stream audio programs according to a playlist. In some examples, the broadcast stations are controlled by software executed on a computer system, in which digitally stored audio recordings are sent to transmitters according to the playlist. Each station is controlled by a computer that provides a graphical user interface to allow a producer or disc jockey (DJ) to modify the playlist of the station. In some examples, when multiple stations participate in a simultaneous broadcast (or "simulcast"), the playlists on the computers are individually configured so that the stations broadcast the same audio programs.

SUMMARY

In one aspect, in general, an apparatus includes a plurality of software-controlled broadcast stations, each station capable of operating in a leader mode or a follower mode during a simulcast. Each station in the follower mode is configured to broadcast the same programs as a station in the leader mode during common program periods, and to selectively broadcast programs that are different from those broadcast by the station in the leader mode during independent program periods.

Implementations of the apparatus may include one or more of the following features. Each station in the follower mode is capable of selectively broadcasting the same programs as the station in the leader mode or different programs than the station in the leader mode depending on operator input. The software-controlled broadcast stations include software-controlled radio stations. In some examples, each station controls signals that are broadcast at a specified base frequency. In some examples, each station is associated with a Universal Resource Locator (URL) and streams content over a network. In some examples, the independent program periods include commercial breaks. In some examples, the stations are configured to broadcast programs that includes commercials or station identifiers during the independent program periods. In some examples, the stations are configured to broadcast programs that includes music, news, or talk shows during the common program periods. The apparatus includes a user interface to allow a user to select one of the stations to operate in the leader mode.

Each station controls a switch that, when the station is in the follower mode, switches between forwarding signals from a first input to a transmitter and forwarding signals from a second input to the transmitter, the first input receiving programs from the station in the leader mode, the second input receiving programs from the station in the follower mode. The station in the leader mode sends a breakaway code and a rejoin code to the stations in the follower mode to indicate the start and end, respectively, of an independent program period. The apparatus includes a plurality of transmitters each to transmit radio frequency signals for one of the stations. In some examples, the apparatus includes a switching network to forward signals from the station in the leader mode to all transmitters during the common program period, and to forward signals from each station to respective transmitters during the independent program period. In some examples, the apparatus includes control logic to control a switching network to forward signals from the station in the leader mode to all transmitters during the common program period, and to forward signals from each station to respective transmitters during the independent program period. The apparatus includes a storage device to store programs and commercials to be broadcast by the stations. Each broadcast station can operate independently of other broadcast stations, without leading or following the other stations.

In another aspect, in general, an apparatus includes a plurality of software-controlled broadcast stations, each station capable of operating in one of a leader mode and a follower mode during a simultaneous broadcast, the stations capable of forming groups in which each group has at most one station in the leader mode. All the stations within each group broadcast the same programs during common program periods, and different stations within each group may broadcast different programs during independent program periods.

Implementations of the apparatus may include one or more of the following features. The software-controlled broadcast stations include software-controlled radio stations.

In another aspect, in general, a method includes identifying a leader station and at least one follower station from among a plurality of software-controlled broadcast stations during a simulcast, controlling the at least one follower stations to broadcast the same programs as the leader station during common program periods, and controlling the at least one follower stations to broadcast programs independently of the leader station during independent program periods.

Implementations of the method may include one or more of the following features. The independent program periods include commercial breaks. Controlling the at least one follower station to broadcast programs independently of the leader station includes controlling the at least one follower station to broadcast commercials or a station identifier during the independent program periods. Controlling the at least one follower stations to broadcast the same programs as the leader station includes controlling the at least one follower station to broadcast the music, news, or talk show programs during the common program periods. The software-controlled broadcast stations include software-controlled radio stations. The method includes executing parallel processes to implement the software-controlled broadcast stations, each process corresponding to one of the stations.

In some examples, the method includes converting digital signals from the software-controlled broadcast stations into analog broadcast signals. Converting the digital signals into analog broadcast signals includes converting digital signals of different stations to analog broadcast signals having different base frequencies, each station corresponding to one of the base frequencies. In some examples, the method includes associating each broadcast station with a Universal Resource Locator (URL) and streaming the programs over a network. The method includes controlling a switching network to forward signals from the leader station to different transmitters that correspond to different stations during the common program period, and to forward signals from each station to respective transmitters during the independent program period.

The method includes generating a leader station schedule specifying which programs to be broadcast by the leader station during the common program periods and the independent program periods. The method includes generating a follower station schedule specifying which programs to be broadcast by the follower station during the independent program periods, in which the follower station schedule does not specify which programs to be broadcast by the follower station during the common program periods. The method includes sending from the leader station to the follower station a breakaway code to indicate the start of an independent program period and a rejoin code to indicate the end of the independent program period. The method includes providing a user interface to allow a user to select one of the plurality of stations as the leader station.

In another aspect, in general, a computer-implemented method includes providing a user interface to allow a user to identify a leader station and at least one follower station from among a plurality of software-controlled broadcast stations during a simulcast, schedule programs to be simultaneously broadcast by the leader station and the at least one follower station during common program periods, and schedule programs to be independently broadcast by the plurality of follower stations during independent program periods.

Implementations of the method may include one or more of the following features. The method includes, responsive to a selection by the user of a leader station, controlling a switching network to forward signals from the leader station to different transmitters that correspond to different stations during the common program period, and to forward signals from each station to respective transmitters during the independent program period. The user interface allows the user to specify pairs of breakaway and rejoin points that correspond to start and end positions, respectively, of independent program periods.

In another aspect, in general, a system includes means for identifying a leader station and at least one follower station from among a plurality of software-controlled broadcast stations during a simulcast, means for controlling the at least one follower stations to broadcast the same programs as the leader station during common program periods, and means for controlling the at least one follower stations to broadcast programs independently of the leader station during independent program periods.

The disclosed systems and techniques may provided one or more of the following advantages. The system allows a user (e.g., a program producer or a DJ) to manage multiple broadcast stations that join in a simulcast. The user can conveniently arrange programs to be simultaneously broadcast by all the broadcast stations without spending manual effort to synchronize the playlists of different broadcast stations. Graphical user interfaces are provided to enable the user to easily select leader stations and follower stations, and to schedule programs to be broadcast by the multiple stations during common program periods and independent program periods.

The details of one or more implementations are set forth in the accompanying drawings and the description below. Other features, aspects, and advantages will be apparent from the description and drawings, and from the claims.

DESCRIPTION OF DRAWINGS

Like reference symbols in the various drawings indicate like elements.

DETAILED DESCRIPTION

Figure 1:
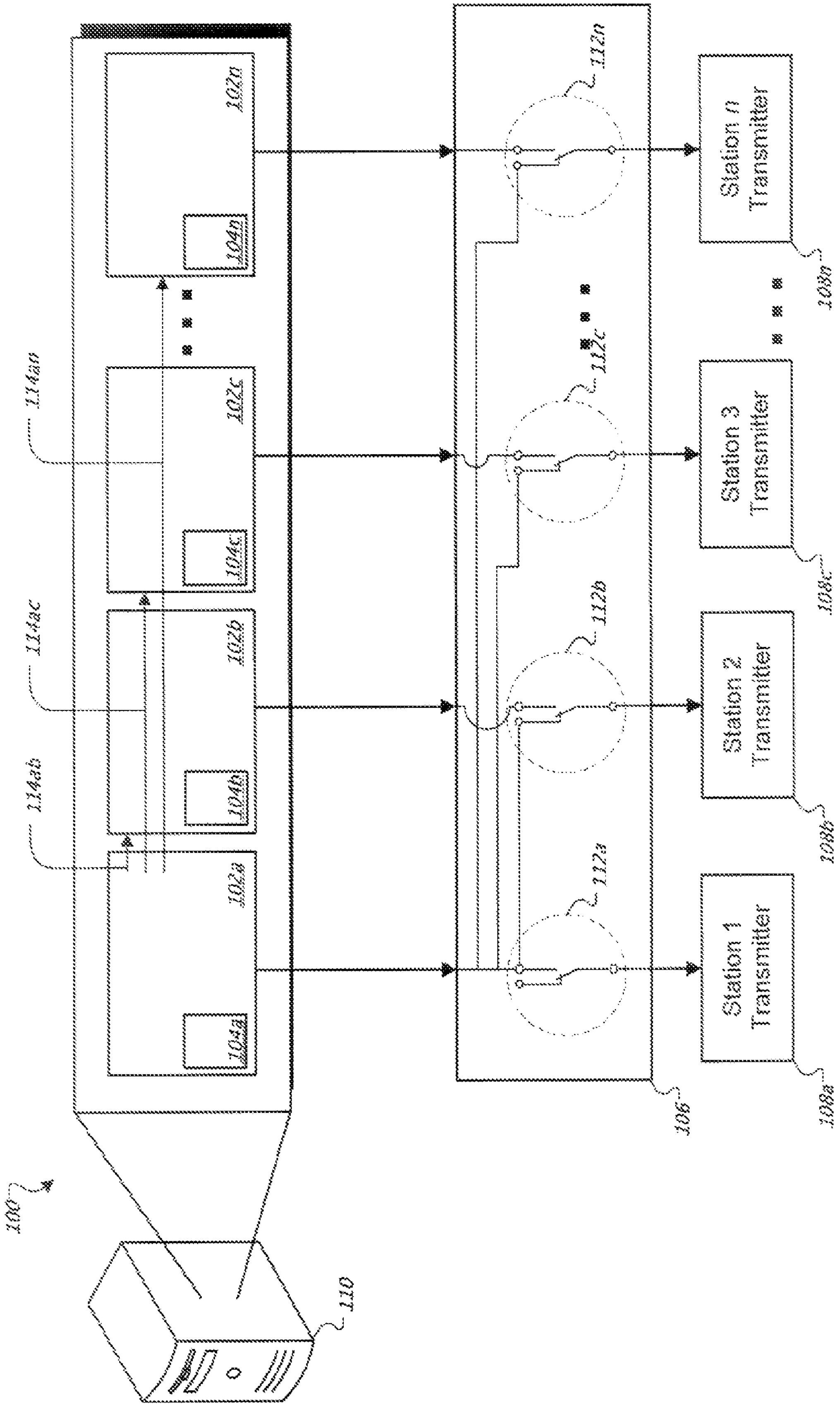
FIG. 1 is a schematic diagram of a broadcast system.

FIG. 1 is a schematic diagram of an example of a broadcast system 100 that includes a plurality of software-controlled broadcast stations 102*a* to 102*n*, collectively referenced as 102. The broadcast stations 102 are controlled by software executing on a workstation 110. The broadcast stations 102 can perform a simulcast in which different stations 102 broadcast the same programs, except for certain periods (e.g., commercial breaks) in which each station may broadcast its own content. The system 100 allows a producer or DJ to designate one station (e.g., 102*a*) as a "leader station" and other stations (e.g., 102*b* to 102*n*) as "follower stations." The producer schedules the programs and commercials to be played on the leader station, and the commercials to be played on the follower stations. The system 100 automatically controls the follower stations to play the same programs as the leader station, except during certain periods, such as commercial breaks, in which the system 100 controls each follower station to play its respective commercials.

A feature of the system 100 is that it allows the producer to conveniently arrange programs to be simultaneously broadcast by all the broadcast stations 102 without spending manual effort to synchronize the playlists of different broadcast stations 102. In this description, the content that is simultaneously broadcast by different stations is referred to as "simulcast content," and the content specific to each station is referred to as "local content." The period during which simulcast content is broadcast is referred to as "common program period."

The system 100 includes a switching network 106 that includes switches 112*a* to 112*n*, collectively referenced as 112. Each switch 112 is controlled by a broadcast station 102. Each switch 112 has an input that receives broadcast signals (i.e., signals representing the simulcast content or the local content) from the broadcast station 102 associated with the switch 112, and inputs that receive broadcast signals from the other broadcast stations 102. Each switch 112 has an output that is electrically connected to a transmitter (e.g., 108*a* to 108*n*, collectively referenced as 108).

The switching network 106 can be separate from the workstation 110, and can be placed at a location different from where the workstation 110 is located (e.g., different rooms or buildings). The workstation 110 can have control logic for controlling the switching network 106. The switching network 106 can also be distributed across different rooms or buildings.

In the example of FIG. 1, the broadcast station 102*a* is selected as a leader station, and the broadcast stations 102*b* to 102*n* are selected as follower stations. FIG. 1 shows a simplified version of the switching network 106 in which the switch 112*a* forwards simulcast content from the leader station 102*a* to the transmitter 108*a*. The switch 112*b* switches between receiving simulcast content from the leader station 102*a* and receiving local content from the follower station 102*b*. The switch 112*n* switches between receiving simulcast content from the leader station 102*a* and receiving local content from the follower station 102*n*, and so forth. Note that any of the broadcast stations 102 can be selected to be a leader station, so each switch 112 is configured to be capable of switching between receiving signals from the station associated with the switch and any other station.

In examples where the programs are broadcast through the airwaves, each of the software-controlled broadcast stations 102 can be viewed as a "virtual broadcast station." Each broadcast station 102 can be associated with a physical broadcast station (which may have, e.g., hardware equipment and/or supporting staff), in which the programs to be broadcast by the physical broadcast station are controlled by the "virtual" broadcast station 102. Each broadcast station 102 can be associated with a physical station that is situated at a location that is the same as or different from where the workstation 110 is located.

For example, different broadcast stations 102 may be associated with different base frequencies. Different broadcast stations 102 may service geographical regions that overlap one another, or regions that are apart from one another. For example, the transmitter 108*a* may transmit the signals to a broadcast module (which includes, e.g., amplifiers, radio frequency modulators, antennas) located at a first location, in which the broadcast module broadcasts the signals at a first base frequency. The transmitter 108*b* may transmit the signals from the station 102*b* to a broadcast module located at a second location, in which the broadcast module broadcasts the signals at a second base frequency, and so forth. For example, the stations 102 can each be associated with a base frequency in the range of 520 to 1,710 kHz for AM broadcasts, 87.9 to 107.9 MHz for FM broadcasts, or other frequencies associated with digital audio broadcasts.

The broadcast system 100 is useful in servicing, e.g., small radio stations that each covers a small geographical area, all playing the same overall programs (e.g., music, news, talk shows), but play different commercials (or local news clips) that are targeted toward local preferences. The small radio stations may all have the same brand, e.g., "Radio LA." From a listener's perspective, the listener is tuning in to a large network radio station, even though the programs are serviced by a small local radio station supported by local advertisements.

In examples where the broadcast stations 102 are Internet radio stations, different broadcast stations 102 may be associated with different Universal Resource Locators (URLs). Different broadcast stations 102 may provide different audio streams that can be transmitted over the web. Each transmitter 108 may transmit the signals to a network gateway that converts the signals into data packets that can be transmitted over the Internet.

In some examples, some of the broadcast stations 102 are over-the-air radio stations, and some of the broadcast stations 102 are Internet radio stations. Thus, the broadcast system 100 can simultaneously control programs that that are broadcast through the airwaves and programs that are transmitted over the Internet. For example, the leader station may be either an over-the-air radio station or an Internet radio station. The follower stations can be over-the-air radio stations, Internet radio stations, or a combination of both.

In some examples, the workstation 110 includes a storage device (not shown) for storing media assets that can be played by the broadcast stations 102. The media assets may include recordings of, e.g., music, news, talk shows, station jingles, etc. Each media asset is associated with a media asset number. When the producer schedules the playlist for a station, the producer inserts the media assert numbers of the programs to be played into time slots on the playlist. The station 102 then plays the media assets at the scheduled times according to the playlist.

The programs played by the broadcast stations 102 can be, e.g., a music program (e.g., selected from a play list or based on listeners' requests), a talk show (e.g., one or more radio personalities discussing current events), a news show, a lecture, an audio blog, a podcast, or a recording from an audio book. The programs can be in standard definition or high definition.

The stations 102 can transmit region specific content (e.g., advertisements) or station specific content, such as station jingles, which can be used to provide the station call letters and/or numbers, geographical area (e.g., "serving Anaheim"), frequency (e.g., "107.3 FM"), or other station identification.

Generally, simulcast content is divided into segments. Region specific content, station specific content, or both can be played between segments of the simulcast content. For example, an hour-long radio talk show can be split into three segments, where each segment break can include, e.g., advertisements, station jingles, and/or public service announcements.

In some examples, the leader station 102*a* coordinates the simulcast with the follower stations 102*b* to 102*n*. The playlist on the leader station 102 includes codes that indicate when a segment of the simulcast content ends so that the follower stations can breakaway and broadcast local content, and when the next segment of the simulcast content begins so that the follower stations should rejoin and broadcast the simulcast content.

In some examples, the leader station 102*a* sends instructions (e.g., 114*ab*, 114*ac*, and 114*an*) to all the follower stations (e.g., 102*b*, 102*c*, and 102*n*) to indicate when the follower stations can break away from or rejoin the simulcast.

In some examples, the leader station 102*a* broadcasts the simulcast content, and the follower stations 102*b* to 102*n* listen to the leader station 102*a* and rebroadcast the simulcast content through respective transmitters 108*b* to 108*n*. When an independent programming period (e.g., a segment break) occurs, the leader station 102*a* sends a "breakaway" signal to the follower stations 102*b* to 102*n*, indicating that an independent programming period is to start, and provides information about the length of the independent programming period. The term "independent program period" refers to a time interval or event when the follower station is broadcasting local content independent of the leader station.

Upon receiving a breakaway signal, the follower stations 102*b* to 102*n* broadcast local content (e.g., region or station specific content) during the length of independent program period specified by the leader station 102*a*. After the independent program period has passed, the follower stations 102*b* to 102*n* rejoin the simulcast and broadcast the simulcast content originating from the leader station 102*a*.

Instead of sending the length of the programming period, the leader station 102*a* can also send a "rejoin" signal to the follower stations 102*b* to 102*n* at the end of the independent program period to indicate that the follower stations 102*b* to 102*n* should rejoin the simulcast.

In some examples, switching between the simulcast content and the local content can be achieved using the switching network 106. In some examples, the follower stations 102*b* to 102*n* can mute the leader station's 102*a* signal when the follower stations 102*b* to 102*n* transmit their respective local content. The follower stations 102*b* to 102*n* can mute their own broadcast when they rebroadcast the signal of the leader station 102*a*.

In some examples, a control module (not shown) is used to control the leader station 102*a* and the follower stations 102*b* to 102*n* during the simulcast. The control module monitors the content being played on the playlist of the leader station 102*a*, and informs the follower stations 102*b* to 102*n* when to break away from the simulcast and when to rejoin. Instead of listening to the leader station and re-broadcasting the simulcast content provided by the leader station 102*a*, the follower stations 102*b* to 102*n* may receive media asset numbers of the simulcast content and play media assets based on the media asset numbers.

Figure 2:
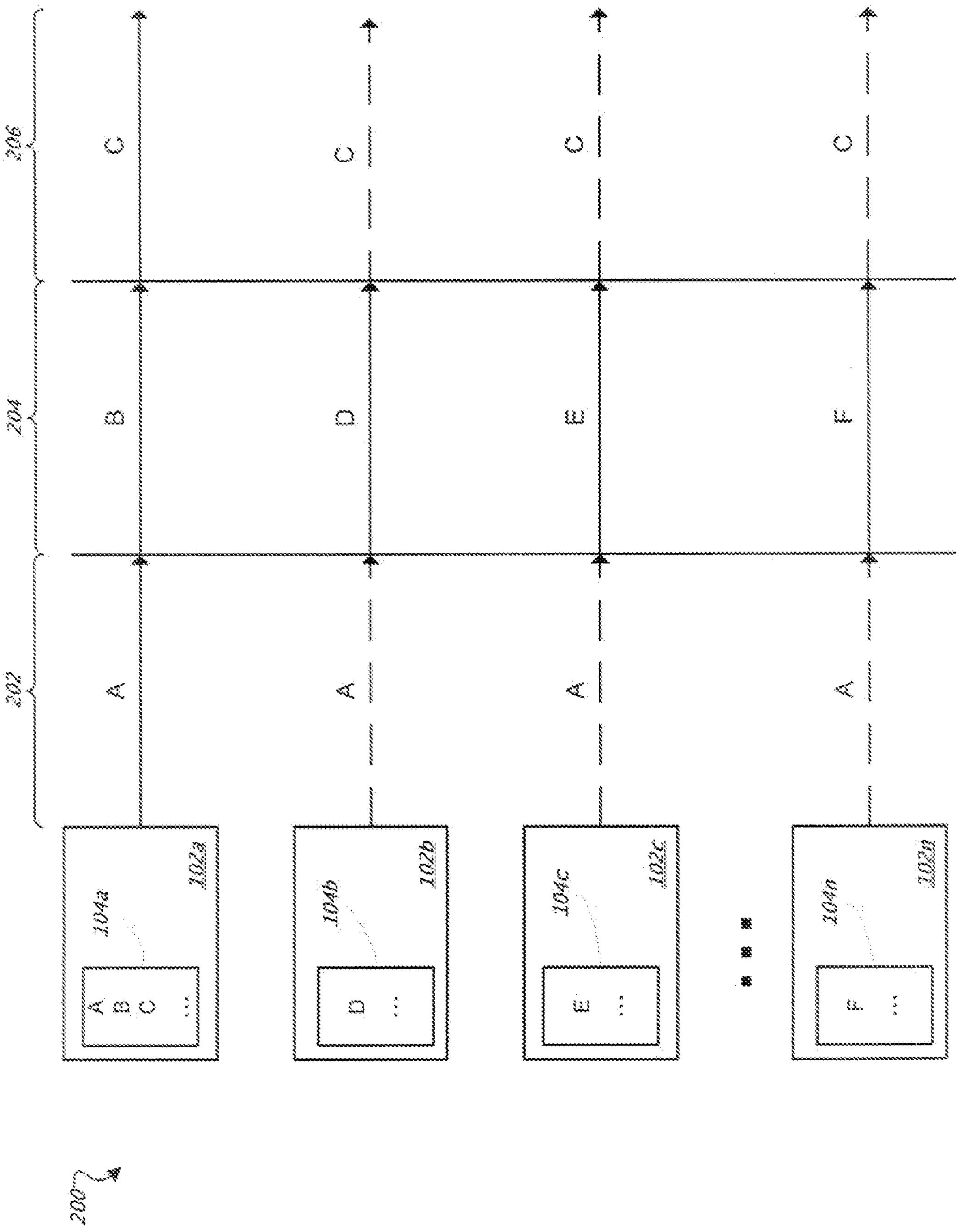
FIG. 2 is a diagram of a broadcast timeline.

FIG. 2 is a diagram showing an example of a broadcast timeline 200 of programs broadcast by the stations of FIG. 1. In this example, station 102*a* is designated as a leader station, and stations 102*b* to 102*n* are designated as follower stations. The leader station 102*a* has a playlist 104*a* having scheduled items A, B, and C, etc., in which items A and C are simulcast content, and B is local content. The follower stations 102*b*, 102*c*, 102*n* have playlists 104*b*, 104*c*, 104*n*, respectively, having local content items D, E, and F, respectively. For example, the playlist 104*b* may specify the general time period when the local content D is played, such as "between 1:00 pm and 2:00 pm" without specifying the exact time when the local content D is played. When the follower station 102*b* receives a breakaway signal from the leader station 102*a* between 1:00 pm and 2:00 pm, the follower station 102*b* plays the local content D. The playlists 104*c* to 104*n* may be configured in a similar manner as the playlist 104*b*.

During a time interval 202, the leader station 102*a* broadcasts the simulcast content A. The follower stations 102*b* to 102*n* also broadcasts the simulcast content A. At the start of a time interval 204, the leader station 102*a* transmits a "breakaway" message to the follower stations 102*b* to 102*n* indicating the start of an independent program period. The message can include the time length of the independent program period. The leader station 102*a* can specify the type of independent program period. For example, the leader station 102*a* can specify a commercial break or a station identification break. In some implementations, the message can be sent at a pre-determined time, or the producer or DJ can generate the message spontaneously during the course of a simulcast.

For example, a commercial break can be scheduled every fifteen minutes, or with another pre-determined time interval, while a station jingle can be triggered at the DJ's discretion. In some implementations, the media assets of the follower stations 102*b* to 102*n* can be linked to media assets of the leader station 102*a*. For example, the DJ can select to play "jingle A" on the leader station 102*a*, and the follower stations 102*b*, 102*c*, and 102*n* can play the station's specific jingle (e.g., "jingle B," "jingle C," and "jingle D," respectively) that is linked to the leader station's "jingle A."

At the end of the segment break or station identification break, the leader station 102*a* may send a "rejoin" message to the follower stations 102*b* to 102*n*. For example, during a time interval 206, the simulcast resumes and the follower stations 102*b* to 102*n* broadcasts the simulcast content provided by the leader station 102*a*.

In the diagram 200, the time intervals 202 and 206 are referred to as "simulcast program periods," and the time interval 204 is an independent program period.

In some examples, the independent program period can be used to broadcast region or station specific programs. For example, during time interval 204, each of the stations 102*a* to 102*n* can broadcast a local news program, a morning talk show, or other programs that are intended for local listeners. Different programs can be broadcast by different stations 102*a* to 102*n* during the independent program period.

The broadcast system 100 provides a graphical user interface (GUI) to allow a producer or DJ to select which station(s) are leader station(s), which stations are follower stations, and which follower station follows which leader station.

Figure 3A:
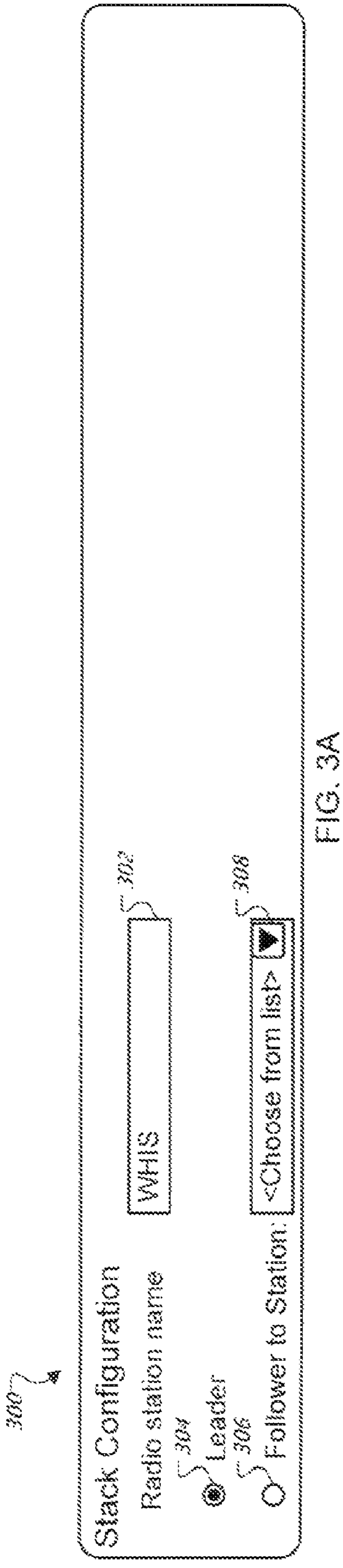
FIG. 3A is a diagram of a graphical user interface.

FIG. 3A is an example of a graphical user interface 300 for selecting the leader and follower stations. The user interface 300 includes a text field 302 that allows the user (e.g., the producer or DJ) to enter the name of a station, such as "WHIS," "WHIX," "WHIZ," or "WHIK," which correspond to stations 102*a* to 102*n*, respectively. Other station identifiers may also be used, such as call signs, station frequencies, or station nicknames (e.g., "Big Country" or "Sports Talk").

The user interface 300 includes radio buttons 304 and 306 that allows the user to choose whether the station identified in the text field 302 is a leader station (by selecting the leader button 304) or a follower station (by selecting the follower button 306). When a leader station has been selected, the leader station's identifier is added to the drop down list 308. There can be more than one leader station. If the user selects the follower button 306, the user can then select which leader station to follow through the drop down list 308.

For example, station WHIS may be selected as a leader station, and stations WHIX, WHIZ, and WHIK may be selected as follower stations that follow the station WHIS. For example, WHIS and WHIX may be selected as leader stations, station WHIZ may be selected as follower station that follows WHIS, and WHIK may be selected as a follower station that follows WHIX.

Figure 3B:
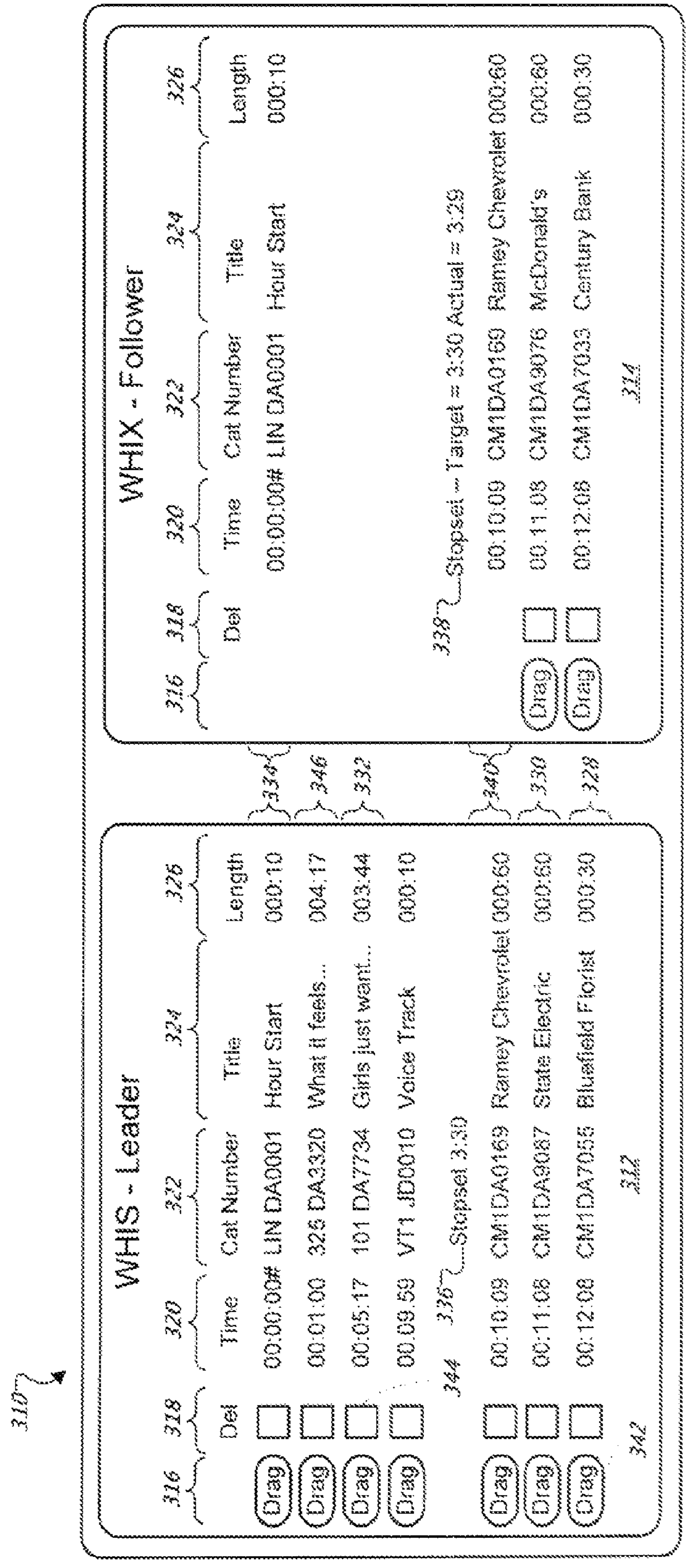
FIG. 3B is a diagram of a user interface for managing playlists.

FIG. 3B is an example of a user interface 310 for managing a playlist 312 of a leader station (e.g., WHIS) and a playlist 314 of a follower station (e.g., WHIX). The playlist 312 will be referred to as the leader playlist 312, and the playlist 314 will be referred to as the follower playlist 314. The leader playlist 312 includes station breakaway and rejoin information. The items in the playlists 312 and 314 correspond to the broadcasted radio content. The leader playlist 312 includes the leader station's simulcast content and local content, whereas the follower playlist 314 includes the follower's local content.

Each of the playlists 312 and 314 includes several sections (e.g., 316, 318, 320, 322, 324, and 326) that allow the user to adjust the content items on the playlist. In section 316, drag buttons 342 allow the user to change the ordering of the content items in the playlist 312. For example, the user can click on the drag button 342 and change the position of the content item 328 in the playlist 312. Changing the order of the content items in the playlist 312 results in changing the order of broadcasting the content items by the station WHIS.

The section 318 includes delete check boxes (e.g., 344) that allow the user to remove a content item from the playlist 312. For example, the user can check off the check box 344 to remove content item 332 from the playlist 312, resulting in the content item 332 not being broadcast by the station WHIS.

In the example of FIG. 3B, the leader playlist 312 includes simulcast content, such as content items with titles "What it feels . . . ," "Girls just want . . . ," and "Voice track." Because the follower station WHIX follows the leader station WHIS when the simulcast content is broadcast, some of the simulcast content items are not shown in the follower playlist 314. For example, content item 332 appears in the leader playlist 312 but not in the follower playlist 314.

The follower playlist 314 includes local content items, which can be the same as or different from the corresponding local content items in the leader playlist 312. The follower playlist 314 may also include some simulcast items. For example, the follower playlist 314 shows the first simulcast content item with the title "Hour Start" to show the beginning of the simulcast. For example, an advertiser may request that a commercial (e.g., "Ramey Chevrolet") be broadcast at several stations, so that the commercial appears in both the leader playlist 312 and the follower playlist 314.

Editing the order of content items or removing content items from the leader playlist 312 may affect the content items in the follower playlist 314. For example, some advertisers may specify that certain local content (e.g., commercials) be played during a certain hour at the follower station WHIX. If local content items are dropped from the leader playlist 312, resulting in shortening of the independent program period, there may not be sufficient time to play the local content at the follower station WHIX at the specified hour. As a result, some of the local content items may be dropped or suspended from the playlist 314.

Some of the content items in the follower playlist 314 cannot be modified because the follower station is configured to follow the leader station in playing these items. For example, the content item "Hour Start" of station WHIX is linked to the content item "Hour Start" of station WHIS as multi-station media assets. Similarly, the content item "Ramey Chevrolet" of station WHIX is linked to the content item "Ramey Chevrolet" of station WHIS as multi-station media assets. Thus, in the sections 316 and 318 of the follower playlist 314 corresponding to the content items with titles "Hour Start" and "Ramey Chevrolet," there are no drag buttons 342 or delete check boxes 344, as is the case in the leader playlist 312.

The section 320 displays a start time for each content item. For example, content item 334 starts at start time "00:00:00#." The "#" symbol, appearing in the playlist at midnight, can be used to indicate, e.g., that any unplayed items from the previous day between 11:00:00 PM to 11:59:59 PM are discarded. The start time for each content item is automatically adjusted as new content items are added. For example, the start time of content item 332 can automatically be determined by adding the run-time of the previous content item 346 to the start-time of the previous content item 346.

The section 324 shows a catalogue number for each content item. The catalogue number is used to access the content stored on one or more storage devices. For example, the content item 334 includes a catalogue number "LIN DA0001" that can be used to access station's 102*a* content 104*a*. The content can be accessed through traditional search techniques (e.g., database queries, file-based searches, and the like).

The section 324 shows a title for each content item, allowing the user to easily identify the content items. The section 326 shows a total run-time of the content item. For example, the content item 332 has a total run-time of three minutes and forty-four seconds. The total run-time 326 can be used with the start-time 320 to determine the start-time 320 of the next content item.

The playlists 312 and 314 include stopset information, which is used to specify the start and duration of an independent program period. For example, the leader playlist 312 includes a stopset 336 that indicates an independent program period of 3 minutes and 30 seconds is scheduled after the content item "Voice Track." The follower playlist 314 includes a stopset 338 that indicates the target independent program period is 3 minutes and 30 seconds, while the actual total duration of the local content adds up to 3 minutes and 29 seconds. The broadcast system 100 may compensate for the discrepancy by, e.g., adding a 1-second silence after the local content is broadcast on the follower station WHIX. If the follower station's material is much shorter than that of the leader station, the system 100 may insert audio material to fill the gap. The audio material can include, e.g., commercials, public service announcements, and station promotional material. After the independent program period ends, the follower station WHIX automatically rejoins the leader station WHIS.

Figure 4:
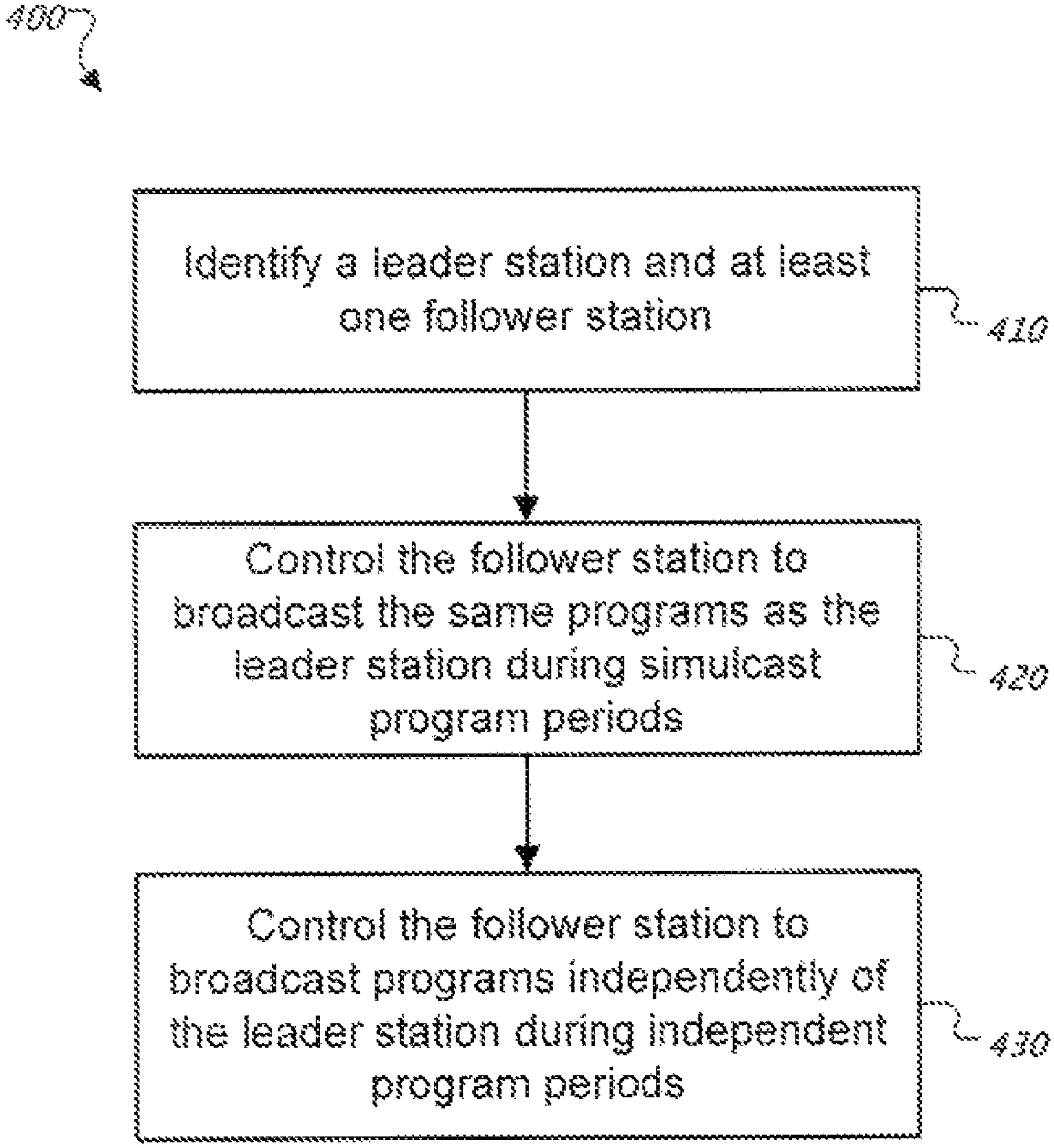
FIG. 4 is a flowchart of a process for managing a broadcast system.

FIG. 4 is a flow chart of an example of a process 400 for managing broadcast stations 102 during a simulcast. In step 410, a leader station and at least one follower station is identified. For example, in reference to FIG. 3A, a user (e.g., a producer or DJ) can select a leader station by clicking on the leader selection button 304. Once a leader station is selected, other stations can be selected to follow the leader station.

In step 420, during simulcast program periods, the follower stations are controlled to broadcast the same programs as the leader station. For example, in reference to FIG. 1, the follower stations 102*b* to 102*n* listen to the broadcast of the leader station 102*a* and rebroadcast the simulcast content. The follower stations 102*b*-102*n* control respective switches 112*b*-112*n* such that simulcast content from the leader station 102*a* is forwarded to the transmitters 108*b*-108*n* during the simulcast program periods.

In step 430, during independent program periods, the follower stations are controlled to broadcast programs independently of the leader station. For example, the playlist of the leader station can be configured to include a break, or the DJ can interrupt the simulcast to play a station jingle. The independently broadcast programs can include, e.g., commercials, station jingles, news shows, talk shows, music, or other programs. The follower stations 102*b*-102*n* control respective switches 112*b*-112*n* such that local content from the follower stations 102*b*-102*n* are forwarded to the respective transmitters 108*b*-108*n*.

Figure 5:
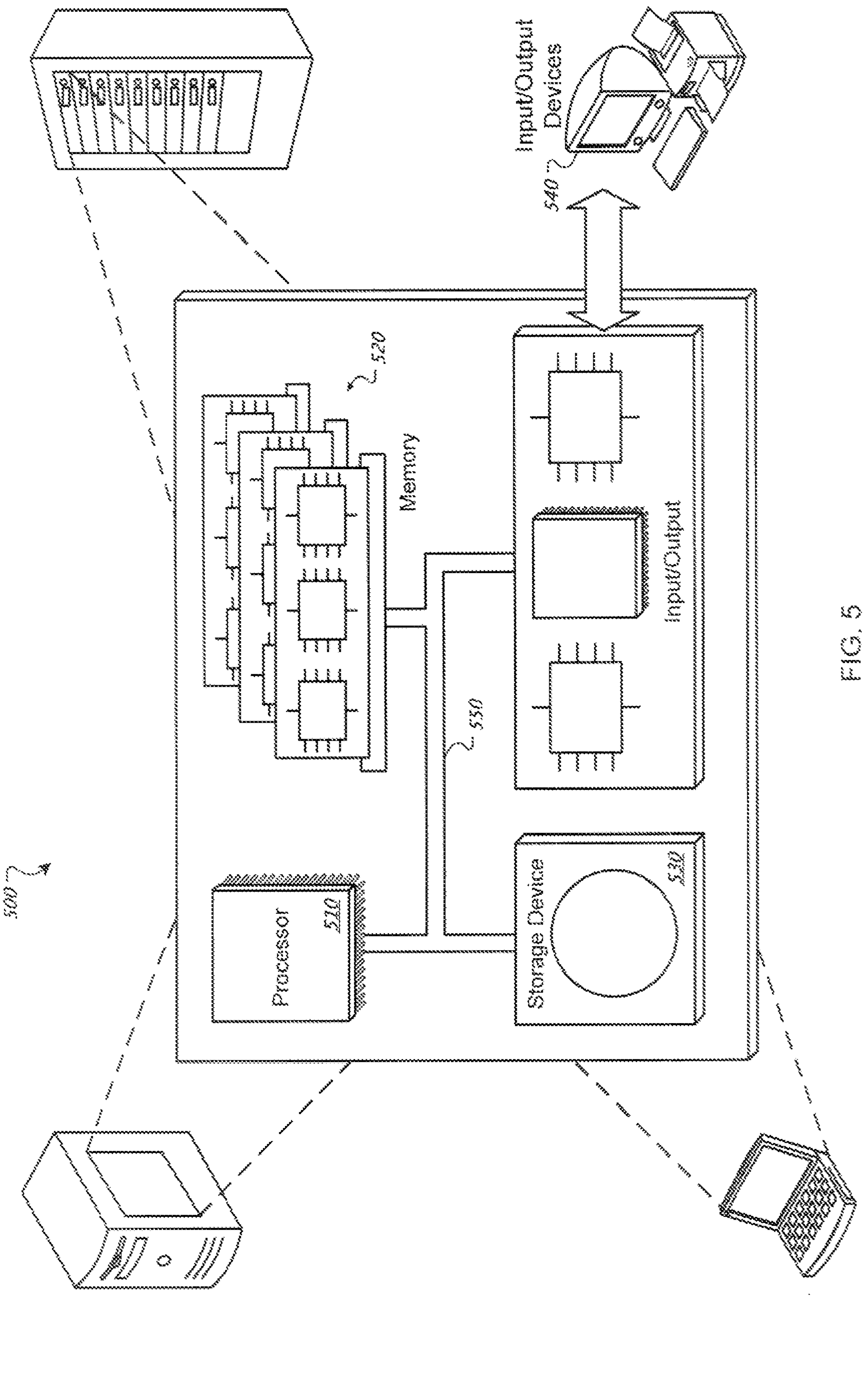
FIG. 5 is a schematic diagram of a computing system.

FIG. 5 is a schematic diagram of an example of a generic computer system 500 that can be used to implement, e.g., the workstation 110. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, during the independent program periods, the follower stations can play any content, whether local, national, or international oriented content. The follower stations can broadcast, e.g., a weather report or a traffic update. During the independent program periods, the follower stations can broadcast any content, e.g., music, news, talk show programs if time permits. Simulcast content can include any material, including commercials or station jingles, at the discretion of the producer or DJ. The stations are not limited to broadcasting audio content. The media assets can include multimedia content, such as text, images, or video.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations have been described. Nevertheless, it will be understood that various modifications may be made without departing from the spirit and scope of the following claims.

What is claimed is:

1. An apparatus comprising:

a plurality of software-controlled broadcast stations, each station configured to operate in a leader mode or a follower mode during a simulcast;

wherein each station in the follower mode is configured to broadcast the same programs as a station in the leader mode during common program periods, and to selectively broadcast programs that are different from those broadcast by the station in the leader mode during independent program periods, wherein the station in the leader mode sends a breakaway code and a rejoin code to the stations in the follower mode to indicate the start and end, respectively, of an independent program period.

2. The apparatus of claim 1 wherein each station in the follower mode selectively broadcast the same programs as the station in the leader mode or different programs than the station in the leader mode depending on operator input.

3. The apparatus of claim 1 wherein the software-controlled broadcast stations comprise software-controlled radio stations.

4. The apparatus of claim 1 wherein each station controls signals that are broadcast at a specified base frequency.

5. The apparatus of claim 1 wherein each station is associated with a Universal Resource Locator (URL) and streams programs over a network.

6. The apparatus of claim 1 wherein the independent program periods comprise commercial breaks.

7. The apparatus of claim 1 wherein the stations are configured to broadcast programs that comprise commercials or station identifiers during the independent program periods.

8. The apparatus of claim 7, wherein a length of the independent program period for each station in the follower mode is specified for a predetermined time interval by a station in the leader mode.

9. The apparatus of claim 1 wherein the stations are configured to broadcast programs that comprise music, news, or talk shows during the common program periods.

10. The apparatus of claim 1, further comprising a user interface to allow a user to select one of the stations to operate in the leader mode.

11. The apparatus of claim 1 wherein each station controls a switch that, when the station is in the follower mode, switches between forwarding signals from a first input to a transmitter and forwarding signals from a second input to the transmitter, the first input receiving programs from the station in the leader mode, the second input receiving programs from the station in the follower mode.

12. The apparatus of claim 1, further comprising a plurality of transmitters each to transmit radio frequency signals for one of the stations.

13. The apparatus of claim 1, further comprising a switching network to forward signals from the station in the leader mode to all transmitters during the common program period, and to forward signals from each station to respective transmitters during the independent program period.

14. An apparatus comprising:

a plurality of software-controlled broadcast stations, each station configured to operate in a leader mode or a follower mode during a simulcast; and control logic to control a switching network to forward signals from the station in the leader mode to all transmitters during the common program period, and to forward signals from each station to respective transmitters during the independent program period, wherein each station in the follower mode is configured to broadcast the same programs as a station in the leader mode during common program periods, and to selectively broadcast programs that are different from those broadcast by the station in the leader mode during independent program periods.

15. The apparatus of claim 14, further comprising a storage device to store programs and commercials to be broadcast by the stations.

16. The apparatus of claim 14 wherein each broadcast station can operate independently of other broadcast stations, without leading or following the other stations.

17. A method comprising:

identifying a leader station and at least one follower station from among a plurality of software-controlled broadcast stations during a simulcast;

controlling the at least one follower stations to broadcast the same programs as the leader station during common program periods;

controlling the at least one follower stations to broadcast programs independently of the leader station during independent program periods; and controlling a switching network to forward signals from the leader station to different transmitters that correspond to different stations during the common program period, and to forward signals from each station to respective transmitters during the independent program period.

18. The method of claim 17 wherein the independent program periods comprise commercial breaks.

19. The method of claim 17 wherein controlling the at least one follower station to broadcast programs independently of the leader station comprises controlling the at least one follower station to broadcast commercials or a station identifier during the independent program periods.

20. The method of claim 17 wherein controlling the at least one follower stations to broadcast the same programs as the leader station comprises controlling the at least one follower station to broadcast the music, news, or talk show programs during the common program periods.

21. The method of claim 17 wherein the software-controlled broadcast stations comprise software-controlled radio stations.

22. The method of claim 17, further comprising executing parallel processes to implement the software-controlled broadcast stations, each process corresponding to one of the stations.

23. The method of claim 17, further comprising converting digital signals from the software-controlled broadcast stations into analog broadcast signals.

24. The method of claim 23 wherein converting the digital signals into analog broadcast signals comprises converting digital signals of different stations to analog broadcast signals having different base frequencies, each station corresponding to one of the base frequencies.

25. The method of claim 17, further comprising associating each broadcast station with a Universal Resource Locator (URL) and streaming the programs over a network.

26. The method of claim 17, further comprising generating a leader station schedule specifying which programs to be broadcast by the leader station during the common program periods and the independent program periods.

27. The method of claim 17, further comprising generating a follower station schedule specifying which programs to be broadcast by the follower station during the independent program periods, in which the follower station schedule does not specify which programs to be broadcast by the follower station during the common program periods.

28. A method comprising:

identifying a leader station and at least one follower station from among a plurality of software-controlled broadcast stations during a simulcast;

controlling the at least one follower stations to broadcast the same programs as the leader station during common program periods;

controlling the at least one follower stations to broadcast programs independently of the leader station during independent program periods; and sending from the leader station to the follower station a breakaway code to indicate the start of an independent program period and a rejoin code to indicate the end of the independent program period.

29. The method of claim 28, further comprising providing a user interface to allow a user to select one of the plurality of stations as the leader station.

30. A computer-implemented method comprising:

providing a user interface at a computer to allow a user to identify a leader station and at least one follower station from among a plurality of software-controlled broadcast stations during a simulcast, schedule programs to be simultaneously broadcast by the leader station and the at least one follower station during common program periods, and schedule programs to be independently broadcast by the plurality of follower stations during independent program periods; and responsive to a selection by the user of a leader station, controlling a switching network to forward signals from the leader station to different transmitters that correspond to different stations during the common program period, and to forward signals from each station to respective transmitters during the independent program period.

31. A computer-implemented method comprising:

providing a user interface at a computer to allow a user to identify a leader station and at least one follower station from among a plurality of software-controlled broadcast stations during a simulcast, schedule programs to be simultaneously broadcast by the leader station and the at least one follower station during common program periods, and schedule programs to be independently broadcast by the plurality of follower stations during independent program periods, wherein the user interface allows the user to specify pairs of breakaway and rejoin points that correspond to start and end positions, respectively, of independent program periods.

* * * * *